Oct. 11, 1938.   P. E. SHAVER   2,132,975
WELDING METHOD AND APPARATUS
Filed Feb. 21, 1935    4 Sheets-Sheet 1
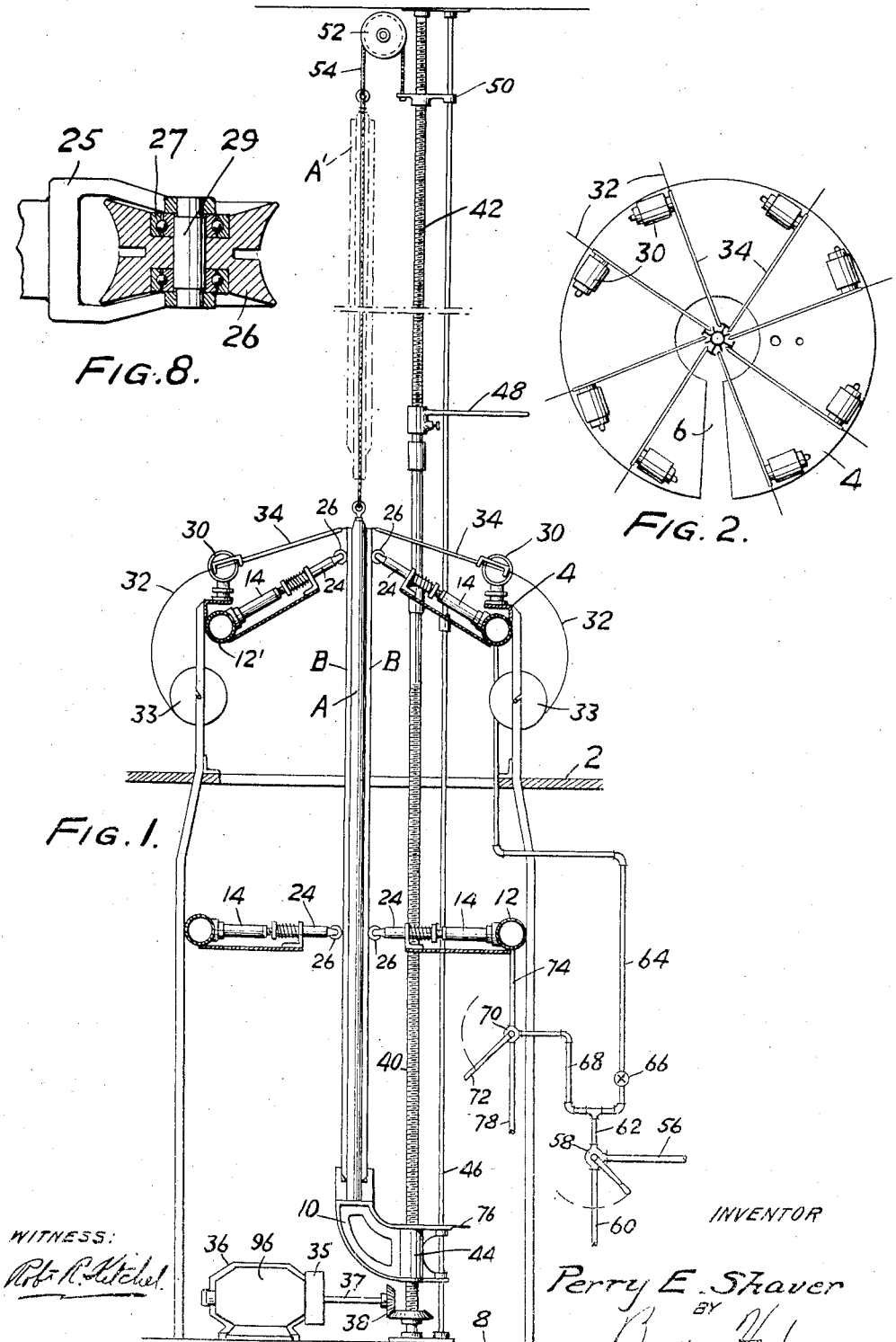
INVENTOR
Perry E. Shaver
BY
ATTORNEYS.

Oct. 11, 1938.　　　　P. E. SHAVER　　　　2,132,975
WELDING METHOD AND APPARATUS
Filed Feb. 21, 1935　　　　4 Sheets-Sheet 3

INVENTOR
Perry E. Shaver
BY
ATTORNEYS.

WITNESS:

Patented Oct. 11, 1938

2,132,975

UNITED STATES PATENT OFFICE 2,132,975

WELDING METHOD AND APPARATUS

Perry E. Shaver, Philadelphia, Pa., assignor to Sun Shipbuilding & Dry Dock Company, Chester, Pa., a corporation of Pennsylvania Application February 21, 1935, Serial No. 7,525

7 Claims. (Cl. 219—8)

This invention relates to a welding method and apparatus particularly designed for the welding of elongated articles as, for example, the welding of fins upon tubes.

This application is, in part, a continuation of my application Ser. No. 694,597, filed October 21, 1933.

Considerable difficulty has been heretofore experienced in welding fins or the like upon long tubes such as are used, for example, for heat transfer purposes in stills, condensers or the like. Difficulties have been encountered particularly where there are a number of fins to be held in place and welded simultaneously, as, for example, when a tube three inches or four inches in diameter and twenty or more feet long is to have welded to its outside and running lengthwise of it six or eight fins by a continuous weld. Tubes of this type are of such considerable length that they are flexible to an appreciable degree in themselves and, furthermore, are to be associated with fins which are not of great thickness and which are, consequently, also flexible, usually more so than the tubes. The operation of holding these fins in proper place against the tubes and welding one fin at a time as, for example, by hand welding, is so tedious, time-consuming, and expensive as to prevent the use of this type of tube wherever possible, although for certain types of apparatus a tube of such type would be highly desirable.

Furthermore, in the case of a tube of considerable length, the application of heat to one side, as occurs when only one or two welds are made at one time, brings the tube locally to the high welding temperatures, causing such substantial warping as to materially interfere with proper contact between the two parts to be welded together and to render the tubes useless because of lack of straightness after the welding operation is completed.

Heretofore the only method of welding fins on a long tube has involved carefully clamping the fin against the tube and subsequently using a hand welding apparatus to feed an electrode into and along the line of contact of the fin with the tube. In general, it has been necessary to attach the fin to the tube locally by means of welds of short extent. In any such case, not only does there occur the warping referred to above, but where the addition of a number of fins to each tube is necessary, the welding apparatus must be run the complete length of the tube for the fixation of each one. The operation has accordingly been very time-consuming and expensive and the results far from satisfactory.

It is the object of the present invention to provide for holding parts to be welded and the electric welding of elongated tubes or the like in such fashion as to prevent substantial warping or bending during the welding operation, and permit, for example, the holding of fins to a tube and a number of lines of welding to be produced simultaneously. The operation, furthermore, can be made automatic and is of this nature in the preferred embodiment of the invention, the tube or other elongated article being moved vertically past electrodes fed at a fixed point. The method and apparatus forming the subject matter of this invention are further adapted to facilitate the handling of long pipes or the like, which has heretofore been difficult during welding operations.

While the invention is applicable particularly to securing fins or strips of various shapes upon elongated tubes of circular or other cross-section, or elongated members of various shapes, the method and apparatus are also applicable to the closure of seams, particularly where there are a number of lengthwise extending seams to be closed simultaneously. This, together with other useful features of the apparatus, will be brought out more fully in the following description when read in conjunction with the accompanying drawings, in which Fig. 1 is a diagrammatic sectional view illustrating the association of parts designed for automatically carrying out the method;

Fig. 2 is a plan view showing a plurality of associated welding heads arranged to simultaneously produce eight welds in the attachment of eight fins;

Fig. 8 is a sectional detail showing the mounting of a fin-holding roller; and

The particular apparatus shown herein is adapted to handle tubes having a length of twenty feet or more with diameters of three to four inches to which are to be attached eight fins running substantially the full length of the tubes. The apparatus for handling such tubes is illustrated because tubes of such lengths carrying such a number of fins present major difficulties in handling not only due to their size alone but their flexibility and the difficulty of spacing, holding and welding such a plurality of fins simultaneously.

Figure 3:
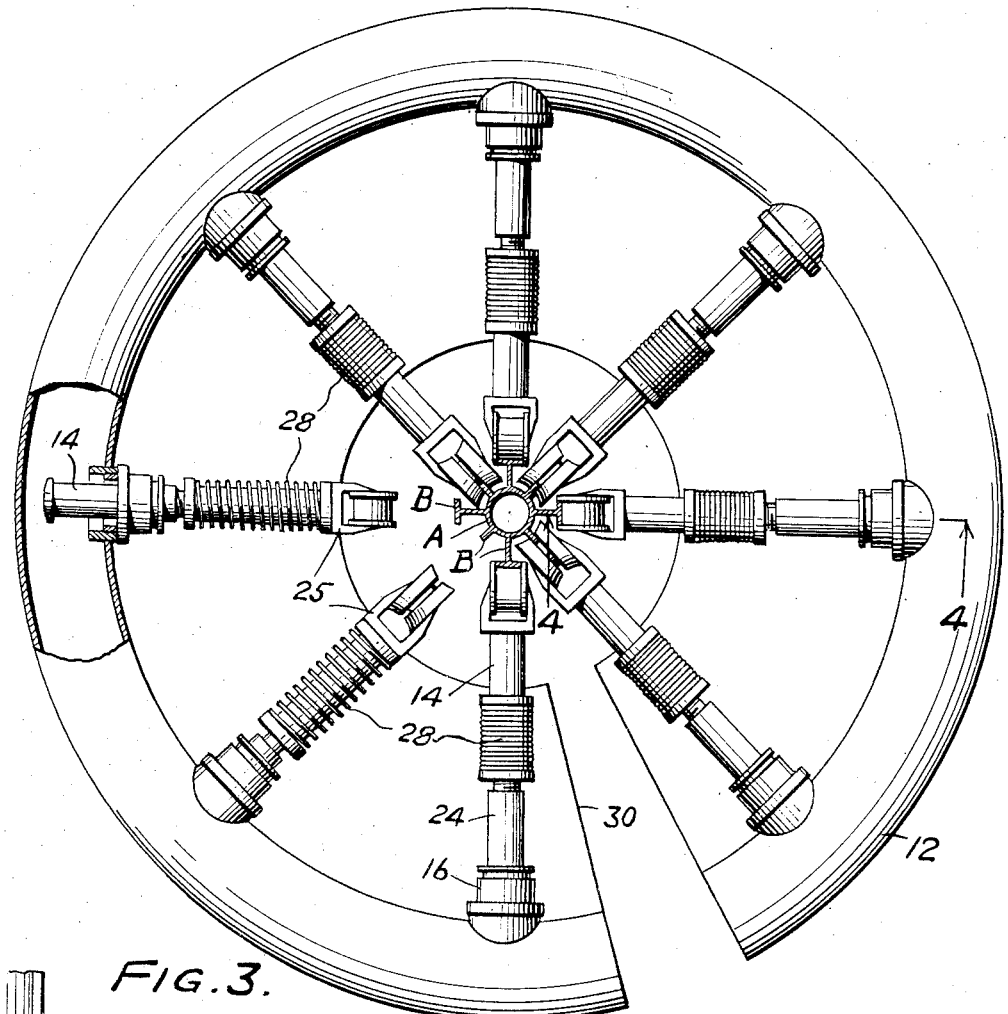
Fig. 3 is a detail view showing pneumatically operated means for holding fins and a tube in proper assembled relationship.
Figure 7:
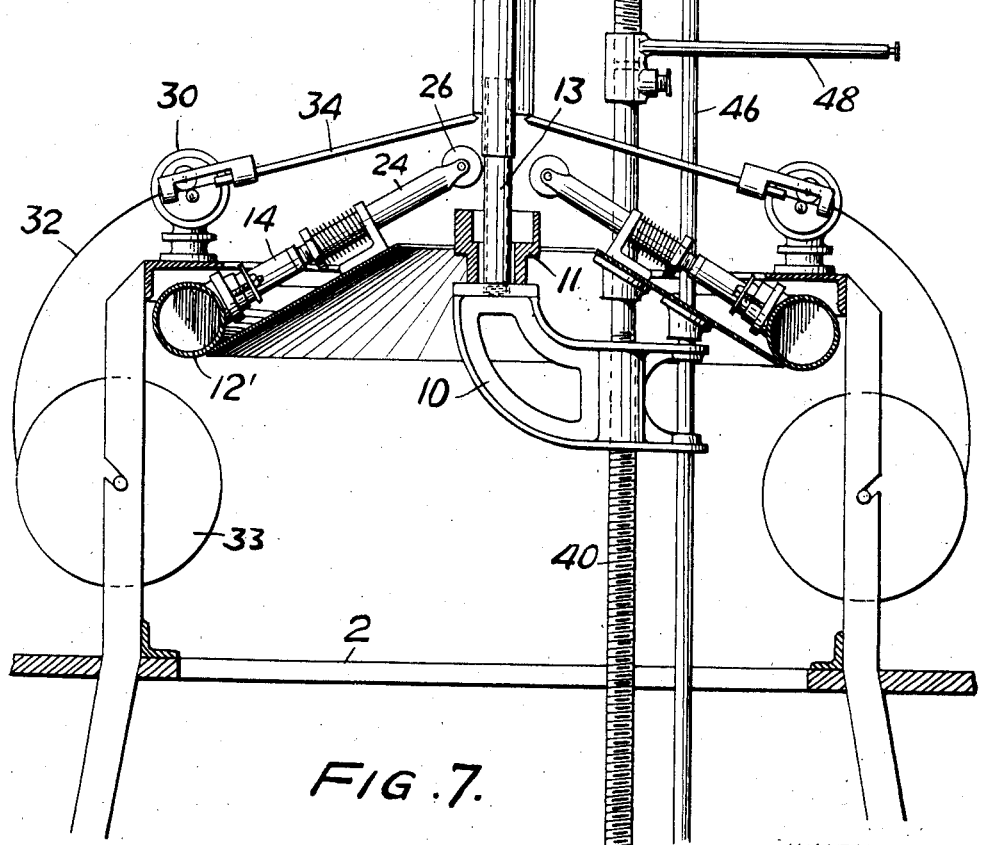
Fig. 7 is an enlarged detail view showing the relationships of various parts adjacent the welding electrodes.

The working floor or platform 2 supports a stand 4 on which the welding elements and other mechanism are mounted. The stand or platform table 4 is provided with an opening 6 extending inwardly to its center, which is provided with a circular opening as shown in Fig. 2. The floor 2 is also provided with a laterally extending opening in order that the tubes may be presented to the apparatus from the side, the tubes being originally on a floor below the platform 2. A socket member 10 is provided initially located adjacent the lower floor 8 by which the various parts to be assembled and welded may be at least initially supported, although preferably they are also supported by this socket during the welding operation. As illustrated in Fig. 7, member 10 carries a socket 11 so shaped as to receive the fins to be attached to the tube and the tube itself, the tube being additionally supported upon an upright post 13, which serves for its guidance. The particular socket used depends upon the individual work which is being done, sockets of special shapes being provided for each job. Instead of separate sockets, of course, adjustable lower holding means may be provided to take care of various types of work. In the present case, the tube A is designed to have secured to it a plurality of fins B of various shapes, as indicated in Fig. 3.

Figure 4:
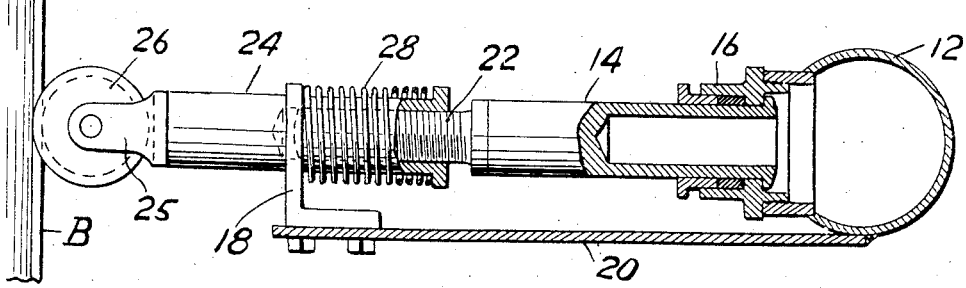
Fig. 4 is a section taken on the plane indicated at 4—4 in Fig. 3 showing details of the holding means.

Located at suitable intervals between the socket member 10 and the position of the welding electrodes are suitable holding means designed to maintain the parts to be welded together in proper assembled relationship. These are illustrated as comprising curved tubes 12 and 12' carrying inwardly directed pistons 14. In the present case two of these holding means are illustrated which are identical except for the fact that the pistons 14 in one case extend horizontally and in the other case at an angle to afford support directly adjacent the welding electrodes. Details of both of these holding means are illustrated in Figs. 3 and 4.

The tube 12 in each case is provided with a plurality of inwardly extending stuffing boxes 16, each of which is arranged for the guidance and fluid-tight passage of a piston 14. A plate 20 serves to support individual guiding brackets 18 through which extensions 24 threaded to the pistons as indicated at 22 are adapted to extend. The threaded arrangement is provided to enable fine adjustment to be made to insure that proper equalization of holding pressure is applied about the tube. The extensions 24 are provided with bifurcated ends 25 supporting pins 29 on which, through the medium of roller bearings 27, there are mounted holding rollers 26 having their peripheries properly shaped to engage the particular fins which are being applied. It will be noted that the bearings lie wholly within the axial limits of the rollers. Such arrangement serves to prevent to a considerable extent the entrance of spattered metal into the bearings, such spattered metal being produced during the welding operation. Two such roller shapes are indicated in Fig. 3, from which the type of engagement which is secured will be apparent. Springs 28 react between the brackets 18 and flanges on the piston extensions 24 to normally urge the pistons outwardly to the interior of the tubes or cylinders 12.

In the present case, these holding means are illustrated as operated by fluid or air pressure. It will be obvious that in place thereof mechanical means may be provided to secure, for example, by the use of suitable springs or screw arrangements, the application of the desired pressure to the parts being welded. The rollers 26 may engage the fins, or if the fins are not oppositely placed, certain of the rollers may be made to engage the tube walls.

A welding head 30 supported by the platform 4 is provided for the making of each weld. Each welding head may be of substantially conventional character, the electrical arrangements of which are hereafter brought out more fully. So far as the mechanical features are concerned, it may be stated that the heads are provided with rollers for feeding welding wires 32 from supply reels 33, the wires being fed through elongated guiding tubes 34 to the line where welding is to take place, for example, where the fins contact with the tube. Provision is made in the usual fashion for grounding the tube to provide a return circuit.

In the preferred embodiment of the invention which is illustrated, two motors are provided, one for securing the slow rise of the work during the progress of the welding operation and the other to secure a rapid movement of the work during lowering and initial adjustment. These two motors are indicated at 36 and 96 respectively and are designed to drive, through individual clutches, a suitable reduction gearing indicated at 35 and shaft 37 which, through bevel gearing 38, serves to rotate a vertically extending screw 40. The socket member 10 is provided with a threaded hub 44 engaged on the screw so that as the screw rotates the socket member is moved vertically, being restrained against rotation by the slight engagement of an extension upon a vertically extending rod 46.

The screw 40 has attached to its upper end a reversely threaded screw 42 which may be adjusted relatively to it by a hand ratchet arrangement indicated at 48. This ratcheting arrangement not only serves to secure a relative fine adjustment of the two screws, but also to lock the two together so that, during normal operation, the socket 10 carried by the lower one moves oppositely to a nut member 50 carried by the upper one. This nut member 50 is held against rotation by sliding engagement with the rod 46. The nut member 50 has secured thereto a cable 54 which passes over a pulley 52 supported either directly by a roof or by a traveling crane. Such crane is desirable if it is necessary to move the work after the welding is completed to a substantial lateral extent to a point of delivery. The cable 54 may be secured to the top of the work in any suitable fashion, for example, to a member clamped to or secured within the tube A. The finished work is indicated at A' in Fig. 1.

The supply of air or liquid for the operation of the pistons 14 is provided through a tube 56 which communicates through a three-way valve 58 with a pipe 62 connected to branches 64 and 68. A pipe 60 provides for the exhaust of fluid from the three-way valve when it is desired to release the holding means from the work. A hand operated valve 66 interposed in the line 64 may be used to control the introduction of fluid to the upper tube or cylinder 12'. Communication to the lower cylinder 12, however, is controlled by a manual or automatically operating valve 70 which is of three-way type and serves to control the delivery of fluid to the cylinder through pipe 74 or its exhaust from the cylinder through pipe 78. Normally when pressure is applied to hold the work, the valve operating handle is in its lower position. An extension 76 on the socket member 10, however, is designed to move the handle 72 upwardly as it rises, cutting off the supply and exhausting the cylinder 12 so that the pistons 14 and the rollers 26 are withdrawn from the work to enable the socket member to pass.

There is best shown in Fig. 3 the type of work which is accomplished by this apparatus. Each of the fins B is welded to the tube A as indicated along its entire length, the welding wires being fed into the junctions as indicated in Fig. 2. As soon as the welding starts after the parts to be welded are assembled, sufficient engagement in the nature of a tacking is provided so that as the tube A is lifted, the fins B will be lifted therewith. While the socket member 10 may be used initially, therefore, it need not necessarily be utilized after the welding begins for the raising of the tube. It may accordingly be arranged so as to have only a limited movement, although in the particular arrangement illustrated it serves for the support of the tube throughout substantially its entire movement. Its upward rise, of course, ceases as soon as it clears the threads on the screw 40. The rollers 26 are primarily relied upon to maintain the parts in proper alignment.

The welding takes place as slow upward movement of the tube and fins occurs. Due to the fact that the tube is vertically and peripherally guided as it moves, there is no substantial tendency for the parts to become misaligned by flexure or warping. Warping is particularly prevented, when a number of fins or the like are being simultaneously welded to the tube, by reason of the even distribution of heat about the same. Even, however, if only a single fin or flange is being attached, the type of support which is used, namely, vertical suspension, prevents a disturbance of the proper relative positions of the elements. The pressure applied by each of the rollers 26 may be of the order of one hundred pounds. After the welding is completed, the tube may be discharged by the suitable lateral displacement of the cable as the nut 50 is caused to move rapidly upwards by the rapid operation of the motor 96.

In order to insure the production of proper results, it is desirable that an apparatus of this type should be automatic to as great a degree as possible so that if any accident occurs which might result in improper work, the entire operation will be interrupted. If welding by any one of the units should be interrupted, all of the welding should cease. Furthermore, if, for some reason as, for example, an overload, the feed of the work should slow down, the welding should be interrupted, otherwise welds of improper type would result. In order to provide a substantially complete automatic operation, various electrical elements are provided of the types indicated in Fig. 9, which figure represents a wiring diagram showing not only the major operating elements such as motors and generators, but also various interlocking control devices to insure the proper combined operation.

There is indicated at 80 a constant potential generator driven by a motor (not shown) supplied with commercial current. Because of the necessity for flexibility of operation and close control, it is desirable to use direct current for the drive of the parts and consequently the generator is of a direct current type so arranged as to maintain a substantially constant line potential of about sixty volts irrespective of variations in the commercial supply. The constant potential leads from this generator are indicated at 82 and 84.

Figure 9:
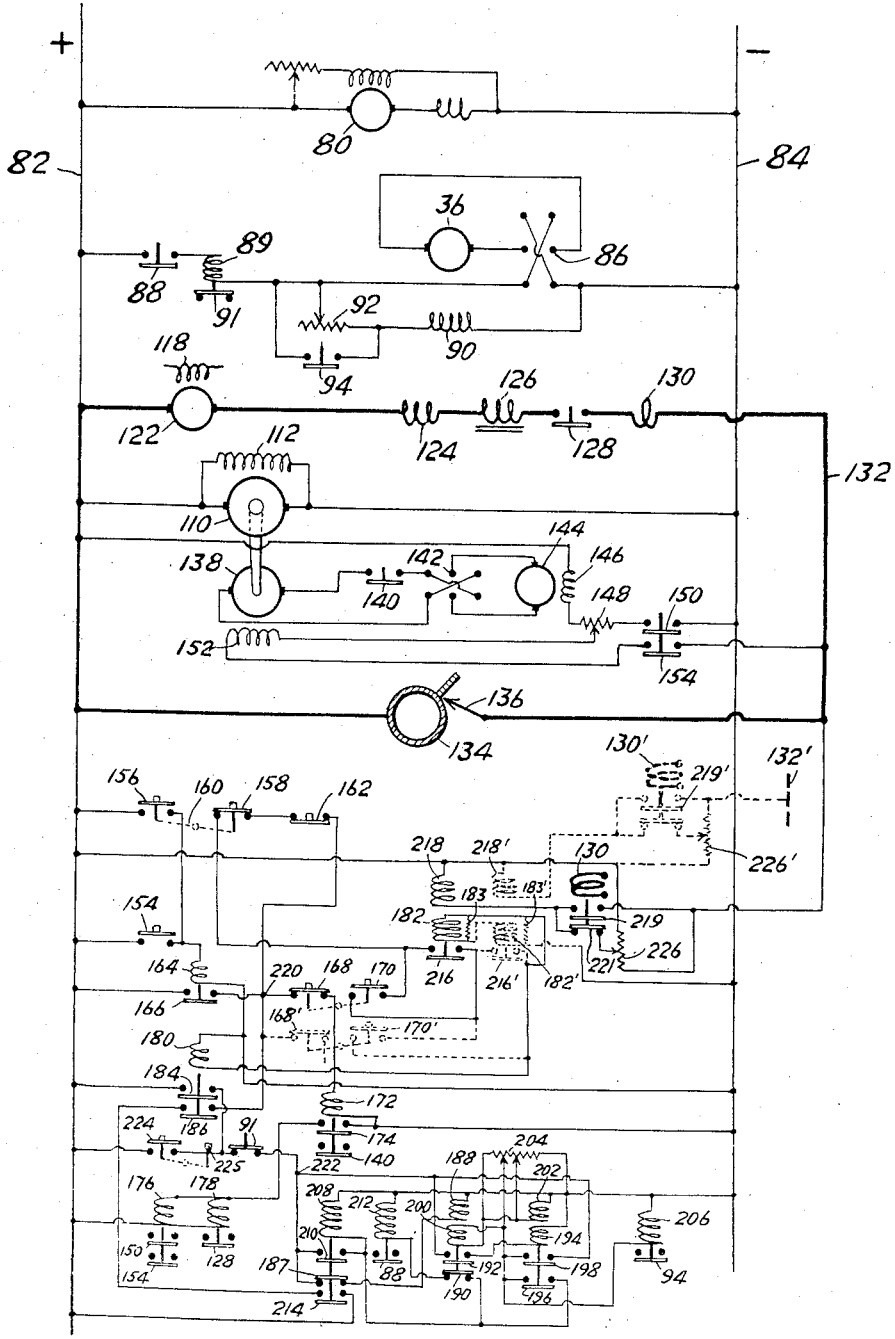
Fig. 9 is a wiring diagram showing certain of the control elements of the apparatus.

The armature of the hoist motor 36 is indicated by that numeral in Fig. 9 and is connected across the line through a reversing switch 86 and a relay switch 88, there being in the circuit an overload relay coil 39 adapted to open contactor 91 if an excessive current is taken by the motor. The contactor 91 is illustrated in the lower portion of the diagram in its relationship to other control devices. The motor 36 is provided with a shunt field 90 in series with which there is a field rheostat 92 which is adjustable to determine the speed of operation of the hoist motor. The rheostat may be short-circuited by the contactor 94 in order to secure a larger starting torque. This contactor 94 will be referred to later.

Since the high speed hoist motor is not interconnected with the automatic controls, it is not shown in the wiring diagram. This motor 96 may be of any desired type operated either from the constant potential supply or directly from the commercial supply of the plant.

The armature of the welding generator is indicated at 122. This generator is driven by a motor which may be energized either from the constant potential supply or the commercial supply. A separate exciter (not shown) supplies the shunt field 118 of the welding generator which has a series field 124. Welding current is supplied through this series field, a reactor 126, contactor 128 and relay coil 130 to the line 82 and to the welding line 132 connected to the electrode 136, which is adapted to weld the grounded work 134. A separate generator is supplied for each electrode and in the present instance the connections are diagrammatically illustrated in such fashion as to cause the welder to be of the constant current automatic type. This type of welder is well known and involves the automatic feed of the electrode wire in such fashion as to maintain a certain predetermined arc. Only so much of the control devices is illustrated as serves to indicate the relationship thereto of certain control relays referred to hereafter. The control devices include a motor 110 provided with a shunt field 112 directly connected across the constant potential line, said motor driving a control generator 138 which is connected through a relay control contactor 140 and reversing switch 142 to the armature 144 of an electrode feed motor which is provided with a shunt field 146. The fields 146 and 152 are interconnected to the constant potential lines 82 and 84 and to the welding current line 132 through an adjustable potentiometer 148 and relay control contactors 150 and 154 as illustrated. Switch 142 may be manually operated to effect forward or reverse feed of the welding wire. The control is otherwise automatic and of conventional type to insure a proper feed during the operation. The contactors 140, 150 and 154 are controlled as described below.

The lower portion of Fig. 9 illustrates the automatic connections which insure a proper related operation of the various elements of the apparatus and particularly insure a complete shut-down whenever one of the arcs fails. Certain of the parts of this controlling assembly are duplicated to the number of welding heads which are provided. In order to indicate the interconnections of the parts when a plurality of welding heads are associated as in the present case, the parts associated with one welding head are shown in full lines, while certain parts associated with a second welding head are shown in dotted lines, and designated by numerals corresponding with those of elements of the first head, primed. From this arrangement, showing the association of parts for two heads, it will be obvious how duplication can be continued to the extent of taking care of any number of heads.

Each of the welding heads has its individual start switch 168 and stop switch 170 interconnected as diagrammatically illustrated so that when the start switch is closed the stop switch is opened. If only some of the total number of welding heads are to be operated, then the apparatus is prepared by closing the switches 168 of those heads which are to be operated and leaving switches 168 open (and consequently 170 closed) of those heads which are not to be used. It will be noted that the various switches 170 are shunted across corresponding relay controlled contactors 216. As will be clear hereafter, the various contactors 216 for the several units are arranged in series to close a circuit only if all of contactors 216 are closed or, alternatively, if for each contactor 216 that is not closed there is closed the corresponding switch 170 to complete the series.

Two interconnected switches 156 and 158, which may be designated as "inch" and "run" switches, are provided, there being a single pair of these for the entire apparatus. During normal operation the "run" switch 158 is closed. The purpose of the "inch" switch will be referred to hereafter.

A master stop switch 162 and start switch 154 are provided, the former serving to shut down the entire apparatus and the latter, by its depression, serving to set into operation the various controls to bring the various parts into action in proper sequence.

The construction of the control circuit will be clear from a description of the operation involved in starting up the apparatus. Assuming that everything is shut down, the proper switches 168 are closed to predetermine the welding heads which are to be put in operation. As pointed out above, for any switch 168 that is opened, the corresponding switch 170 is closed. The operation of the entire apparatus is then initiated by closing the master start switch 154 and holding such switch closed until all of the arcs are struck.

Closure of 154 energizes relay coil 164, closing contactor 166. The closing of contactor 166 serves to connect the junction 220 to the line 82, this junction being used as a convenient reference point in the further description of the operation.

The energization of 220 serves, through each of the closed switches 168, to energize a corresponding relay coil 172 of which there is one for each welding head. These relay coils, together with 176 and 178, are not shown duplicated, since the connections of the individual sets will be readily understood. Energization of coil 172 serves to close contactors 140 and 174. The former of these closes the circuit between the control generator 138 and wire feeding motor 144. Closure of contactor 174 energizes relay coils 176 and 178. The former closes the contactors 150 and 154, energizing the fields 148 and 152 of the motor 144 and generator 138, respectively, thereby causing the generator to operate the motor to feed the wire forwardly toward the work. The closure of contactors 128 closes the corresponding welding circuit so that when the wire electrode contacts with the work an arc will be struck. As the individual arcs are struck, the corresponding relay coils 180 are energized, closing the contactors 218 and opening the contacts 221. As each contactor 218 is closed, the corresponding relay coil 218 is energized, closing its associated contactor 216. When all of the contactors 216 corresponding to the welding heads which are in operation are closed, they, together with the closed switches 170 of the idle heads, complete a circuit from the junction 220 through normally closed switches 162 and 158 through relay coil 180 to line 84. The coil 180 is thus energized, closing contactors 184 and 186. The coils 182 shunted by resistances 183 are adapted to produce a time delay action in the control of contactors 216 in order that fluctuations of short period or normal instability of the arcs will not result in shutting down the apparatus, contactors 216 remaining closed through such transient disturbances. The resistances 226 which are shunted across coils 218 whenever the relay coils 180 are deenergized, also serve to aid in such stabilization.

The closure of contactor 186 does not immediately effect any result, since its circuit is open at contactor 214. Closure of contactor 184, however, through normally closed overload relay contactor 91, connects junction 222 to line 82. Such connection through normally closed contactor 187 energizes relay coil 188, which opens contactor 190 and closes contactor 192. Closure of 192 in turn energizes relay coil 194, resulting in closure of contactors 196 and 198. Closure of 198 serves to energize the time delay coils 200 and 202, which serve to thereafter prevent rapid dropping of the contactors controlled by coils 188 and 194. The time delay is adjustable through the resistance means indicated at 204, connected across the coils 200 and 202. Closure of contactor 196 simultaneously with 198 serves to energize both coils 206 and 208. Energization of coil 206 closes contactor 94, short-circuiting the field rheostat 92 for the purpose indicated above of insuring high starting torque of the welding hoist motor 36.

Energization of coil 208 closes contactors 210 and 214 and opens contactor 187. Closure of contactor 210 connects coil 208 between junction 222 and line 84 and consequently this relay is self-holding. The opening of contactor 187 deenergizes coil 188 and consequently, due to the time delay action, contactor 190 is closed and 192 opened after a predetermined interval. The closure of 190 results in energization of coil 212 through now closed contactor 210. Consequently, contactor 88 is closed and the welding hoist motor started, the torque being initially quite large due to the continued closure of contactor 94. The opening of 192 results in deenergization of coil 194. Accordingly, after a predetermined interval, contactors 196 and 198 are opened, resulting in deenergization of coil 206, which drops contactor 94, thus bringing into the shunt field circuit of the welding hoist motor the adjustable rheostat 92. The motor then operates at its predetermined speed to move the work properly past the welding electrodes. Finally, coils 208 and 212 remain energized.

The closure of contactor 214 now connects junction 220 to line 82 through the contactor 186. Since energization of 220 now results in continued energization of relay 180, this relay becomes self-holding and the master start switch 154 may be released to its normal opened position. Its opening deenergizes relay 164, which drops contactor 166.

The apparatus is now in its normal running condition, the work being moved upwardly by the welding hoist motor and the arcs being maintained in proper condition automatically.

The stopping of the apparatus either automatically or due to manual intervention is dependent upon deenergization of coil 180. If the master stop switch 162 is opened, it will be obvious that such deenergization will result causing contactors 184 and 186 to be dropped so that the coil will not be reenergized upon release of stop switch 162, and by opening of switch 184, causing a deenergization of relay 208 and consequently of relay 212. Deenergization of junction 220 results in opening of the relays which control the welding generator circuit and also the wire feeding apparatus. Stopping might also occur due to an overload of the welding hoist motor, which will cause contactor 91 to be opened, thus deenergizing relay 208 and opening the circuit, deenergizing relay 180 by causing an opening of contactor 214. The apparatus will accordingly again shut down.

Closing down of the apparatus also results from dropping of any one of the contactors 216 due to more than momentary breaking of the arc or a short circuit of the welding generator resulting from freezing of the electrode to the work. In the latter case the voltage of the welding generator drops off, deenergizing a relay 130 to such extent as to cause it to drop contact 219 just as it will if an arc should become broken. When contact 219 is dropped, the circuit of coil 218 is again immediately closed through the variable resistance 226 and contactor 221. The action of coil 218 is thus made sluggish and prevents immediate dropping of the contactor 216. The interval before the dropping of the last named contactor is also to some extent controlled by adjustment of resistance 180. Although contactor 219 opens before 221 closes, the operation is very fast and takes place before the coil 218 is entirely deenergized.

After the apparatus is closed down for any of the above reasons, it must be restarted in the manner described by pushing the master control button 154 so that the parts of the apparatus are brought into operation in proper sequence.

It is sometimes desired to produce welding at only one spot for the purpose of tacking or the like. To effect such result, it is only necessary to push down the "inch" button 156 after there has been closed one or more of switches 168 corresponding to the head or heads which are to be operated.

While the "inch" switch is in parallel with the master starting switch 154, it will be noted that the switch 158 is opened, thereby resulting in operation only so long as the "inch" button is held depressed against the action of a spring normally tending to open it and close the "run" switch 158. Because of the fact that "run" switch 158 is opened, the coil 180 is not energized and therefore the welding hoist motor is not operated. However, connection is made through one or more of the closed switches 168 through the corresponding relay or relays 172 serving to set into complete operation the associated welding heads in the fashion outlined above. It will be obvious that tacking or the like can be accomplished.

It is also sometimes desirable, particularly in initially locating the work preparatory to starting the welding, to cause the slowly operating hoist motor rather than the high speed hoist motor to move the work without, however, initiating action of the welding heads. In order to accomplish this, there is provided the switch 224 which is normally open and may be opened after closure by depression of a button 225 connected thereto. Closure of switch 224 results in energization of the junction 222, which, due to the operations described above, results in the starting of the welding hoist motor 36, the starting being under substantial torque by reason of the initial short circuiting of the rheostat 92, which is later put in series with the shunt field 90 by the dropping of contactor 94.

In addition to the various automatic electrical operations mentioned above, provision is made for withdrawing the clamping rollers 26 so that the supporting member may pass them as it rises. The pneumatic inward movement of both the upper and lower holding members is effected by manipulation of the main valve 58 by connecting it to a source of compressed fluid 56. Their withdrawal is effected by connecting their cylinders to the atmosphere through passage 60 by another manipulation of the valve 58. The lower holding members, however, can be withdrawn for the reason just indicated by movement of the valve handle 72 by the contact with it of the extension 76 carried by the supporting member 10, such contact serving to move the handle 72 to its upper position to vent the cylinder 12 to the atmosphere. Separate manual manipulation of these lower members may, of course, be effected by hand manipulation of the valve 70. A valve 66 serves to cut out the upper holding members if it is desired to manipulate only the lower ones.

Preliminary manual adjustment of the screw 42 relative to screw 40 is provided by the ratchet 43, which can be used to tighten the cable 54 so that it does its share in the support of the work. In the preliminary ajustments, there may also be used the operation of the welding hoist motor independently of the welding means by manipulation of switch 224. In the placing of the work and the removal from the apparatus after welding has been completed, the high speed reversible motor 96 is, of course, used.

Figure 6:
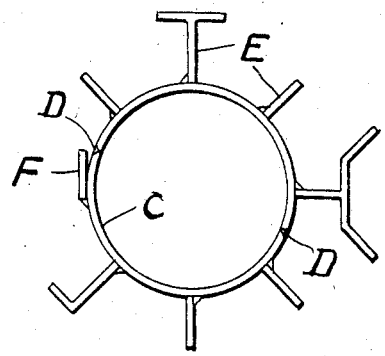
Figs. 5 and 6 are end views illustrating the type of work which may be accomplished by the use of the apparatus.
Figure 5:
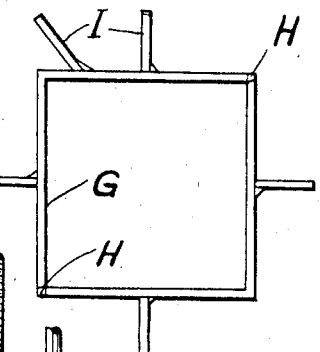

As pointed out above, the method and apparatus of this invention are applicable to perform the welding operations to produce different types of elongated tubes. In Fig. 5, for example, there is shown a built-up tube of polygonal cross-section made from angle members G welded together at opposite corners as indicated at H. The angle members G may be held together by suitable forms of rollers 26 and welding accomplished simultaneously along the two seams H by the use of two heads. At the same time, or thereafter, there may also be attached fins such as indicated at I. Fig. 6 is also illustrative of the character of work which may be accomplished. Seams D may be welded to hold together the two semicircular parts C to form a finished circular tube. Such operation may be accomplished particularly where the resulting tube is not to be perfectly circular in form but is to have an irregular shape which, in certain instances, may not be capable of being rolled, but which may be built up by welding together separate parts. Various types of fins or lengthwise running plates or the like may be attached as indicated at E and F, and such attachments may be accomplished simultaneously with the welding of the parts of the tube. To handle parts of different forms of the types indicated, it is only necessary to modify the holding means in a suitable fashion which will be obvious.

It will be clear that various changes may be made in the embodiment of the invention without departing from the scope thereof as defined in the following claims.

What I claim and desire to protect by Letters Patent is:

1. Welding means including welding apparatus occupying a substantially fixed position, means for supporting elongated articles and moving them in the direction of their lengths at a predetermined speed past said welding apparatus to produce progressive welding, and means for interrupting the welding if the predetermined movement does not occur.

2. Welding means including welding apparatus occupying a substantially fixed position, means for supporting elongated articles and moving them in the direction of their lengths past said welding apparatus to produce progressive welding, and means including members occupying fixed positions pressing said articles together to hold them in proper assembled relationship to the said last means, and means for automatically withdrawing said pressing members after a predetermined advance of said elongated articles.

3. The method of welding vertically arranged elongated articles comprising suspending said articles by their upper ends and moving them vertically in the direction of their lengths past fixed welding apparatus, said advance being at such speed as to effect proper progressive welding.

4. Welding means including welding apparatus occupying a substantially fixed position, means for suspending vertically arranged elongated articles by their upper ends and for moving them vertically in the direction of their lengths past said welding apparatus to produce progressive welding, and means for holding in proper contact the portions of said articles which are to be welded.

5. Welding means including welding apparatus occupying a substantially fixed position, means for suspending vertically arranged elongated articles by their upper ends and for moving them vertically in the direction of their lengths past said welding apparatus to produce progressive welding, and means operative at a fixed location adjacent the welding apparatus for pressing said articles together to hold them in proper assembled relationship as they move vertically during the welding operation.

6. Welding means including a plurality of substantially fixed electrical welding units, means for suspending vertically arranged elongated articles by their upper ends and for moving them vertically in the direction of their lengths past said welding units to produce simultaneous progressive welds by said units, and means for holding in proper contact the portions of said articles which are to be welded.

7. Welding means including a plurality of electrical welding units occupying a substantially fixed position, means for supporting elongated articles and moving them in the direction of their lengths past said welding apparatus to produce progressive welding, means for predetermining the welding units, less than all thereof, which are to operate, and means for substantially simultaneously initiating operation of such predetermined units.

PERRY E. SHAVER.